(12) United States Patent
Zeibel et al.

(10) Patent No.: US 11,677,890 B2
(45) Date of Patent: Jun. 13, 2023

(54) APPARATUS FOR DETECTING A TRANSIENT THERMAL GRADIENT IN A SUBSTRATE

(71) Applicant: United States of America, as represented by the Secretary of the Army, Washington, DC (US)

(72) Inventors: Jason G. Zeibel, Fairfax Station, VA (US); William Paul Blase, Alexandria, VA (US); John K. Delaney, Bethesda, MD (US)

(73) Assignee: UNITED STATES OF AMERICA, AS REPRESENTED BY THE SCRETARY OF THE ARMY, Washington, DC (US)

( * ) Notice: Subject to any disclaimer, the term of this patent is extended or adjusted under 35 U.S.C. 154(b) by 172 days.

(21) Appl. No.: 17/361,389

(22) Filed: Jun. 29, 2021

(65) Prior Publication Data

US 2022/0030131 A1  Jan. 27, 2022

Related U.S. Application Data

(60) Provisional application No. 63/055,915, filed on Jul. 24, 2020.

(51) Int. Cl.
| | |
|---|---|
| *H04N 1/32* | (2006.01) |
| *H04N 5/33* | (2023.01) |
| *G01J 5/0804* | (2022.01) |
| *G01J 5/00* | (2022.01) |

(52) U.S. Cl.
CPC ........ *H04N 1/32149* (2013.01); *G01J 5/0804* (2022.01); *H04N 5/33* (2013.01); *G01J 2005/0077* (2013.01)

(58) Field of Classification Search
CPC ..... H04N 1/32149; H04N 5/33; G01J 5/0804; G01J 2005/0077; G07D 7/1205; G07D 7/06

See application file for complete search history.

(56) References Cited

U.S. PATENT DOCUMENTS

| | | | | |
|---|---|---|---|---|
| 8,064,102 | B1* | 11/2011 | Zhao | B42D 25/333 358/1.9 |
| 2003/0193987 | A1* | 10/2003 | Zalameda | G01J 5/0805 374/7 |
| 2012/0140791 | A1 | 6/2012 | Lawandy | |
| 2020/0348182 | A1* | 11/2020 | Cheng | G01J 3/2889 |

* cited by examiner

*Primary Examiner* — Christopher Wait
(74) *Attorney, Agent, or Firm* — Richard J. Kim

(57) ABSTRACT

An apparatus detects a transient thermal gradient in a substrate. The apparatus is comprised of an electromagnetic radiation source configured to emit source electromagnetic radiation; a fast shutter configured to block the source electromagnetic radiation when closed, and open in response to a command to pulse the source electromagnetic radiation; a substrate support that supports a substrate disposed to emit a pulsed radiation from a back side of the substrate when the source electromagnetic radiation is pulsed through the substrate; and a detector configured to face the back side of the substrate. The detector is used to detect a transient thermal gradient in the pulsed radiation.

17 Claims, 3 Drawing Sheets

APPARATUS FOR DETECTING A TRANSIENT THERMAL GRADIENT IN A SUBSTRATE

CROSS-REFERENCE TO RELATED APPLICATIONS

This application claims priority to U.S. Provisional Patent Application No. 63/055,915, filed on Jul. 24, 2020, the disclosure of which is incorporated herein by reference in its entirety.

GOVERNMENT INTEREST

The invention described herein may be manufactured, used, sold, imported, and/or licensed by or for the Government of the United States of America.

FIELD OF THE INVENTION

The present subject matter relates generally to using electromagnetic radiation to detect a transient thermal gradient in a substrate.

BACKGROUND OF THE INVENTION

The initial concept for this invention was to create a system to detect watermarks in paper or parchment, regardless of the presence of ink or paint on their surface. Watermarks have typically been added to paper by a paper mill to convey information about the paper, such as the quality, the date made, and/or the mill that generated the paper. (The watermark is visible when a blank sheet of paper or parchment is held up to a light source such that the light shines through the paper.) Thus, historians are very interested in the watermarks on the paper of historical documents. However, when the paper has been painted or written on, the watermark may be difficult to see.

SUMMARY OF THE INVENTION

An affordable device is disclosed for detecting watermarks on substrates such as paper using electromagnetic radiation, such as infrared (IR) radiation. While this invention was initially developed to recover information about watermarks, the same device can be used to find any mark, imbedded difference, or preparatory feature in a low thermal mass object. This is done by looking for short temporal duration thermal gradients or density difference in low mass substrates before the substrate has a chance to heat up in response to a thermal pulse.

The present invention broadly comprises a method and apparatus for detecting a transient thermal gradient in a low mass substrate, the apparatus including: an electromagnetic radiation source configured to emit source electromagnetic radiation; a shutter configured to block the source electromagnetic radiation when closed, and to open in response to a command; a substrate support that supports the substrate; and a high sensitivity uncooled thermal imaging detector configured to detect electromagnetic radiation emitted by the substrate after source electromagnetic radiation strikes the substrate to detect the transient thermal gradient in the substrate.

In one aspect, an apparatus is disclosed for detecting a transient thermal gradient in a substrate. The apparatus is comprised of an electromagnetic radiation source configured to emit source electromagnetic radiation; a fast shutter configured to block the source electromagnetic radiation when closed, and open in response to a command to pulse the source electromagnetic radiation; a substrate support that supports a substrate disposed to emit a pulsed radiation from a back side of the substrate when the source electromagnetic radiation is pulsed through the substrate; and a detector configured to face the back side of the substrate and detect a transient thermal gradient in the pulsed radiation.

Yet, in another aspect, a method is disclosed for detecting a transient thermal gradient in a substrate. The method is comprised of the steps of mounting a low mass substrate capable of having a mark on a substrate support; generating source electromagnetic radiation from an electromagnetic radiation source towards the mounted low mass substrate; fast opening a fast shutter to allow a pulse of the source electromagnetic radiation to be incident on a shutter side of the mounted low mass substrate to result in a pulsed radiation through the substrate; and receiving the pulsed radiation through the substrate using a detector disposed to detect a transient thermal gradient in the pulsed radiation.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

Figure 1:
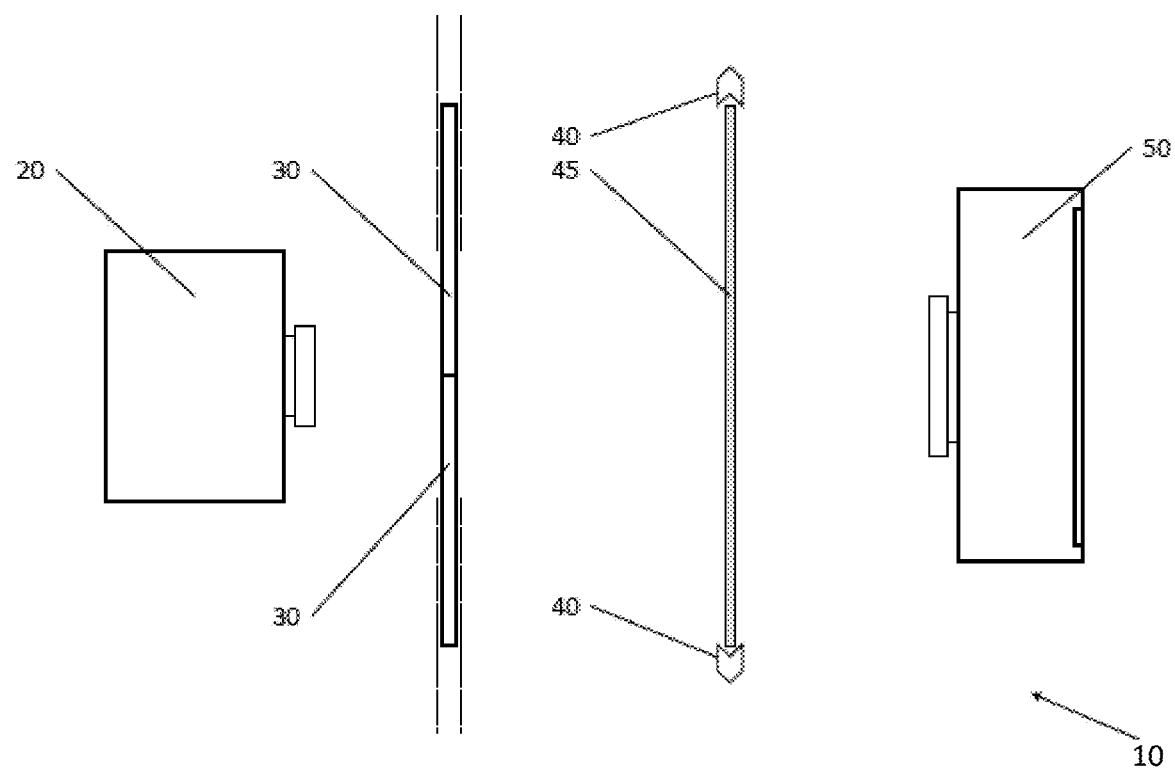
FIG. 1 illustrates a schematic of a first embodiment of the present invention before the shutter is opened.

FIG. 1 shows a schematic of an apparatus 10 in accordance with a first embodiment of the present invention. Apparatus 10 includes an electromagnetic radiation source 20, a shutter 30, a substrate support 40 onto which is mounted substrate 45, and electromagnetic radiation detector 50.

Substrate 45 may include a watermark or other feature embedded in a low mass substrate such as paper, parchment, or fabric. If so, the watermark will create a transient thermal gradient in the substrate around the watermark if the substrate has electromagnetic radiation incident thereon. This transient thermal gradient can then be imaged by detector 50 to detect the feature. Further, other structures in a substrate that form transient thermal gradients can also be detected with the present apparatus. These modifications are within the scope of the invention as claimed.

In one embodiment, electromagnetic radiation source 20 is a blackbody source at 60 C that produces thermal IR radiation having an expected blackbody spectrum peaking in the long wave infrared. However, other wavelengths of electromagnetic radiation may be used, and these modifications are within the scope of the invention as claimed. For example, radiation in the mid-wave infrared (MWIR) or very long wave infrared (VLWIR) portions of the IR spectrum may be used (e.g. 3.0-50 μm) and this is within the scope of the invention as claimed.

In one embodiment, shutter 30 is a high speed shutter capable of opening in 0.1 sec. Shutter 30 must be capable of not only blocking the radiation from source 20, but also of insulating substrate from the heat radiated by source 20. It is important that the substrate 45 remain at room temperature prior to and for a short time immediately after opening shutter 30.

In one embodiment, shutter 30 is made of a foam-core carbon-fiber composite sheet covered with aluminum sheet to reflect infrared light from source 20. The two leaves are mounted on linear bearing stages and driven by a high-speed linear motor with a computer-controlled driver.

Substrate support 40 simply holds substrate 45 between source 20 and detector 50 without blocking any of the radiation from reaching detector 50. Substrate 45 may be, for example, a painting on a piece of paper. However, other substrates may be reviewed using the present invention such as fabric or other low thermal mass substrates that would respond quickly to a large thermal source.

In one embodiment, detector 50 is an uncooled longwave (8 to 13 micron wavelength) infrared camera that can acquire images at 30 to 60 frames per second. This is chosen due to the high spatial resolution and relatively low cost in order to make the system reasonably affordable to a broader class of experimenters.

Figure 2:
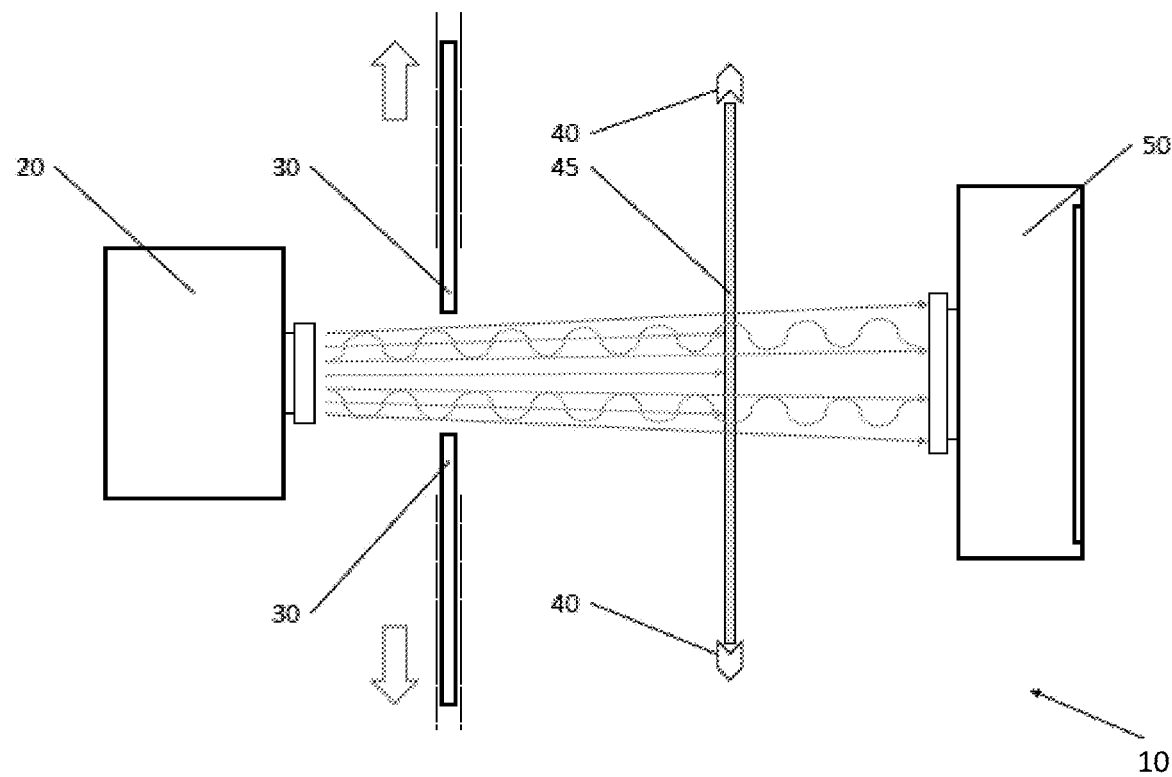
FIG. 2 illustrates a schematic of the first embodiment of the present invention after the shutter is opened.
Figure 3:
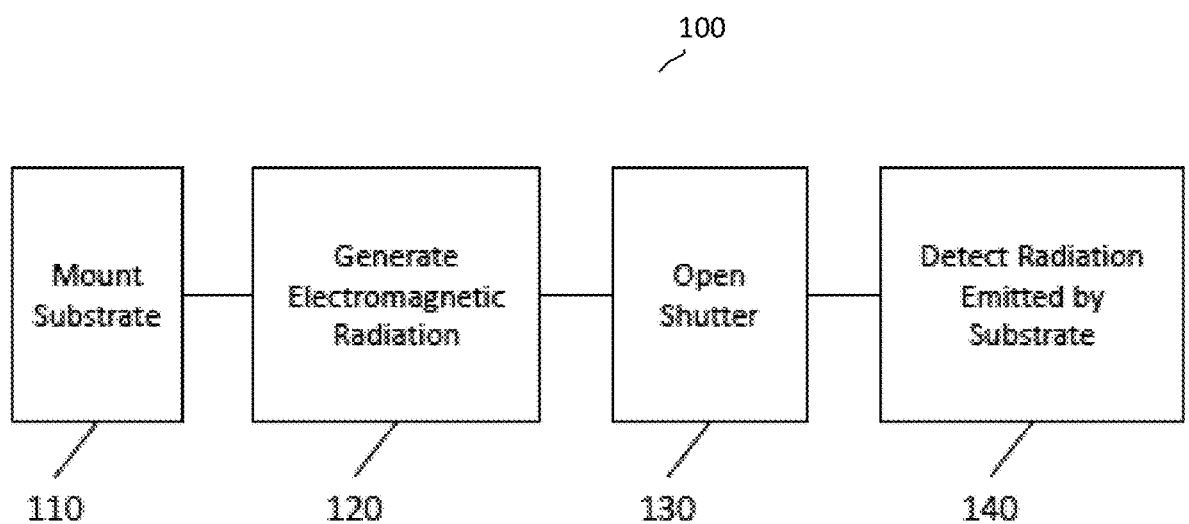
FIG. 3 shows a flow chart of an embodiment of a method using an apparatus as shown in FIGS. 1 and 2.

FIG. 1 shows the first embodiment of the invention with shutter 30 closed, and FIG. 2 shows shutter 30 open. Shutter 30 is opened in accordance with method 100 shown in FIG. 3.

Method 100 includes mounting substrate 45 on substrate support 40 (step 110), generating electromagnetic radiation with source 20 (step 120), opening shutter 30 (step 130), and detecting the radiation emitted by substrate 45 (step 140).

In step 130, shutter 30 is driven by a high-speed electrical motor and is capable of opening in approximately 1/10th second. This puts out a pulse of infrared radiation with a fast-rising edge which back-illuminates substrate 45 for the detector 50. In step 140, detector 50 gathers data with an image acquisition system from approximately 1 second before opening shutter 30 to 1 second after.

The substrate 45 will, of course, heat up when it is illuminated by the radiation from source 20, although the temperatures are deliberately kept to a level where substrate 45 cannot be damaged. Over the 10 or so video frames (approximately 1/3 second at 30 frames/second) immediately following the opening of shutter 30, the watermark will both transmit light differently from the surrounding substrate and heat up at a different rate from surrounding substrate 45—even though covered by ink or paint. This differential transmission by the target can be due to slight density variations within the areas of the feature or watermark and is observable before any significant heating of the object under study occurs.

These differences are evident in the acquired camera video and even though different parts of the watermark may respond at slightly different times over the 10 or so frames, before the entire substrate 45 heats to the point where the image is washed out in the detector 50, by averaging and otherwise combining the frames from the whole sequence in post-processing, the entire watermark may be recovered. Only by using the fast shutter can these type of features be recovered from low mass substrates such as paper, parchment, or fabric.

However, these are exemplary parameters, and modification made be made which are within the scope of the invention as claimed.

The present written description uses examples to disclose the present subject matter, including the best mode, and also to enable any person skilled in the art to practice the present subject matter, including making and using any devices or systems and performing any incorporated and/or associated methods. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus for detecting a transient thermal gradient in a substrate comprising:
   an electromagnetic radiation source configured to emit source electromagnetic radiation;
   a fast shutter configured to block the source electromagnetic radiation when closed, and open in response to a command to pulse the source electromagnetic radiation, wherein the fast shutter also blocks heat radiated by the electromagnetic radiation source when closed;
   a substrate support that supports a substrate disposed to emit a pulsed radiation from a back side of the substrate when the source electromagnetic radiation is pulsed through the substrate; and
   a detector configured to face the back side of the substrate and detect a transient thermal gradient in the pulsed radiation.

2. The apparatus according to claim 1, wherein the substrate is based on a low thermal mass substrate material chosen from a group consisting of paper, parchment and fabric; and wherein the transient thermal gradient is of a watermark, mark, imbedded difference, or preparatory feature.

3. The apparatus according to claim 1, wherein the electromagnetic radiation source is a blackbody source at 60 C that produces thermal IR radiation having an expected blackbody spectrum peaking in the long wave infrared.

4. The apparatus according to claim 1, wherein the source electromagnetic radiation is either a mid-wave infrared radiation or a very long wave infrared radiation.

5. The apparatus according to claim 1, wherein the fast shutter is a high speed shutter capable of opening in 0.1 sec.

6. The apparatus according to claim 1, wherein the fast shutter is comprised of two leaves of foam-core carbon-fiber composite sheet covered with aluminum sheet mounted on linear bearing stages and driven by a high-speed linear motor with a computer-controlled driver.

7. The apparatus according to claim 1, wherein the substrate support holds the substrate without blocking any of the pulsed radiation from reaching the detector when the fast shutter is opened.

8. The apparatus according to claim 1, wherein the detector is an IR camera that detects IR wavelengths between 8 and 13 microns used to generate an image of the transient thermal gradient of a watermark, mark, imbedded difference, or preparatory feature.

9. The apparatus according to claim 1, wherein the detector detects electromagnetic radiation from before the shutter opens until approximately 1 second after the shutter opens, resulting in a plurality of image frames.

10. The apparatus according to claim 1, wherein the detector combines data from different frames to generate an image.

11. The apparatus according to claim 1, wherein the detector generates a time varying image of the transient thermal gradient.

12. The apparatus according to claim 1, wherein the detector is an uncooled longwave infrared camera that can acquire images at 30 to 60 frames per second.

13. A method for detecting a transient thermal gradient in a substrate using the apparatus according to claim 1, said method comprising the steps of:
mounting a low mass substrate capable of having a mark on a substrate support;
generating source electromagnetic radiation from an electromagnetic radiation source towards the mounted low mass substrate;
fast opening a fast shutter to allow a pulse of the source electromagnetic radiation to be incident on a shutter side of the mounted low mass substrate to result in a pulsed radiation through the substrate; and
receiving the pulsed radiation through the substrate using a detector disposed to detect a transient thermal gradient in the pulsed radiation, wherein the detector detects for about ⅓ seconds at about 30 frames/second to yield about 10 video frames immediately following fast opening of the fast shutter, and wherein post-processing by averaging and otherwise combining the frames recovers a transient thermal gradient characteristic of a watermark, mark, imbedded difference, or preparatory feature present in a low mass substrate such as paper, parchment, or fabric.

14. The method according to claim 13, wherein the fast shutter is driven by a high-speed electrical motor and is capable of opening in approximately 1/10th second.

15. The method according to claim 13, wherein fast opening of the fast shutter admits a pulse of infrared radiation with a fast-rising edge which back-illuminates the mounted low mass substrate before the low mass substrate has a chance to heat up in response to the pulse.

16. The method according to claim 13, wherein the detector gathers data with an image acquisition system from approximately 1 second before fast opening the fast shutter to 1 second after.

17. The method according to claim 13, wherein density variations characteristic of a watermark, mark, imbedded difference, or preparatory feature result in differential transmission of the pulsed radiation through the substrate.

\* \* \* \* \*